United States Patent [19]
Owen

[11] Patent Number: 5,173,990
[45] Date of Patent: Dec. 29, 1992

[54] PROTECTOR FOR BED SUPPORTS AND CASTERS; AND METHOD OF MANUFACTURE

[76] Inventor: Raymond Owen, 961 Topview Rd., Edgewood, Md. 21040

[21] Appl. No.: 774,877

[22] Filed: Oct. 11, 1991

[51] Int. Cl.⁵ .............................................. B60B 33/00
[52] U.S. Cl. .............................. 16/18 CG; 248/345.1; 83/54
[58] Field of Search ........... 16/18 CG, 18 R, DIG. 2, 16/DIG. 12. 110 R; 83/54; 5/510, 658; 248/345.1; 267/140; 280/87.051, 87.01

[56] References Cited

U.S. PATENT DOCUMENTS

| 635,084 | 10/1899 | Taylor | 16/DIG. 12 |
| 3,072,955 | 1/1963 | Mitchell | 16/116 R |
| 3,884,495 | 5/1975 | Petock | 248/345.1 |
| 4,700,430 | 10/1987 | Raftery | 16/18 CG |

FOREIGN PATENT DOCUMENTS 1197511 12/1959 France .............................. 16/18 CG

*Primary Examiner*—John Sipos
*Assistant Examiner*—Donald M. Gurley

[57] ABSTRACT

Furniture, or bed support and caster protector device, consisting of a sleeve or cylindrical body constructed of a generally resilient material having a hollow center and adapted to circumvallate the bed support and the supporting caster thereof, a radially disposed cut in the sleeve extending along at least one radius thereof to provide accessing of the sleeve around the bed support and caster, and also to facilitate its removal therefrom, and the sleeve having a longitudinal dimension being slightly greater in distance than an overall distance between a bed rail, disposed at an upper extremity of the bed support, and a support plane or floor for support of the caster, to effect a slight compression of the sleeve due to its resilient characterization and tending to retain the sleeve in locus between the bed rail and the support plane or floor; the sleeve has a lower section with a larger diameter at the lower section and has an upper section with a smaller diameter to provide more distribution of the slight compression within the upper section than in the lower section. This relates more particularly to a quickly applied cushioning cover for bed supports, and casters, to prevent accidental injury to the feet, ankles and shins of the person coming into accidental contact with the bed. The material of the sleeve is of a sponge material, an elastomeric material, an expanded polyurethane material, a foam material, a resinous material, or an open cell material that is removably available for washing and sanitizing the device.

14 Claims, 1 Drawing Sheet

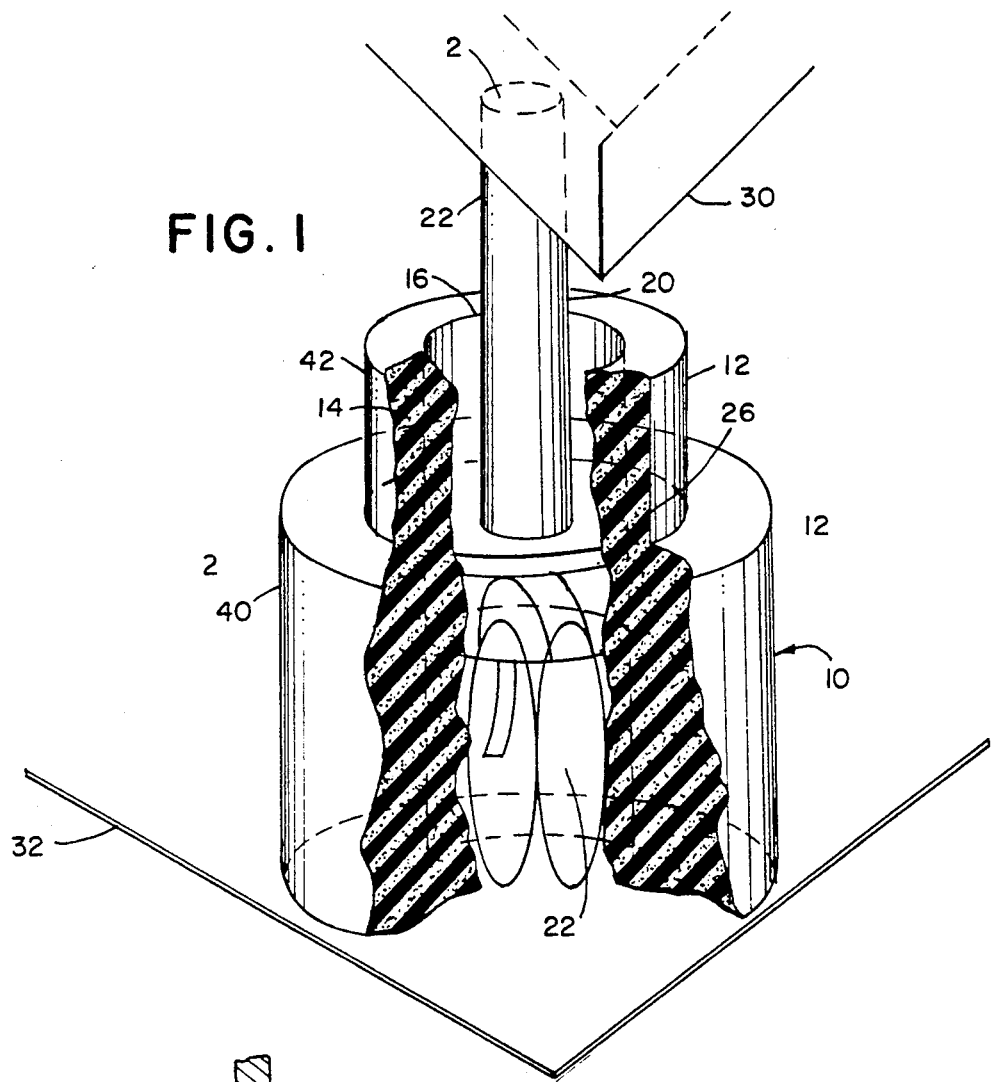

PROTECTOR FOR BED SUPPORTS AND CASTERS; AND METHOD OF MANUFACTURE

BACKGROUND OF THE INVENTION

1. Field of Invention

This invention relates to a protective device for application to furniture, bed supports and casters, consisting of a sleeve or cylindrical body of a generally resilient material having a hollow center and adapted to circumvallate the bed support and the supporting caster thereof. A radially disposed cut in the sleeve extending along at least one radius thereof to provide accessing of the sleeve around the bed support and caster, and also to facilitate its removal therefrom, and the sleeve having a longitudinal dimension being slightly grater in distance than an overall distance between a bed rail, disposed at an upper extremity of the bed support, and a support plane or floor for support of the caster, to effect a slight compression of the sleeve due to its resilient characterization and tending to retain the sleeve in locus between the bed rail and the support plane or floor; the sleeve has a lower section with a larger diameter at the lower section and has an upper section with a smaller diameter to provide more distribution of the slight compression within the upper section than in the lower section.

The material of the sleeve of the invention is of a sponge material, an elastomeric material, an expanded polyurethane material, a foam material, a resinous material, or an open cell material that is removably available for washing and sanitizing the device; and also the method of the construction thereof.

The term "circumvallate" in Webster is defined as something being surrounded by or as if by a rampart, specially enclosed by a ridge, wall or material; and is defined in Steadman's Medical Dictionary (1982) as denoting a structure surrounded by a wall, as the circumvallate papillae of the tongue.

The invention relates further to a method of making a bed support and caster device comprising the steps of forming a sleeve or cylindrical body of a generally resilient material having a hollow center and adapted to circumvallate the bed support and the supporting caster thereof and providing a radially disposed cut in at least one radius of the sleeve, and extending along at least one radius thereof to provide accessing of the sleeve around the bed support and caster, and also to facilitate its removal therefrom, and providing a longitudinal dimension of the sleeve that is slightly greater in distance than an overall distance between a bed rail, disposed at an upper extremity of the bed support, and a support plane or floor for support of the caster, to effect a slight compression of the sleeve due to its resilient characterization and tending to retain the sleeve in locus between the bed rail and the support plane or floor; the sleeve has a lower section with a larger diameter at the lower section and has an upper section with a smaller diameter to provide more distribution of the slight compression within the upper section than in the lower section thereof as more particularly described herein.

2. Description of Prior Art

The prior art of furniture, and bed caster and support devices and the like systems, as well as apparatus and method of their construction in general are found to be known, and generally show horizontal roller bumpers: to protect the mobile furniture accidental contact with the surrounds, to provide a cheap, durable, and ornamental caster cover, and to protect the shoe of a person using the furniture.

These historic bed support and caster protective products have the distinct disadvantage that they do not lend themselves to quick and simple application to the caster, an automatic compressive method of holding the protector in place, a simple open cell design allowing easy cleaning and sterilizing. It is also a disadvantage of the devices of the prior art that there are extra steps required in the fabrication by the methods disclosed, that require a considerable amount of extra labor. These extra steps are not required by the subject invention.

The following references were found to be of interest: U.S. Pat. Nos. 2,885,821; Frick; May 12, 1959, U.S. Pat. No. 2,290,001; Sherman; Jul. 14, 1942, U.S. Pat. No. 2,059,348; Herold; Nov. 3, 1936, U.S. Pat. No. 1,641,127; Densalow; Aug. 30, 1927, U.S. Pat. No. 672,138; Stockwell; Apr. 16, 1901.

Stockwell shows a furniture caster guard for a chair-leg that protects the caster without surroundingly encompassing the entire caster itself.

Densalow surroundingly encompasses the caster with a cylindrical sheath without protecting the member receiving the shank of the caster itself.

Herold discloses a bell shaped guard without providing any protection at all for the chair leg that receives the pintle of the caster.

Sherman and Frick disclose a bumper tire for providing a vertical protector beneath the caster sleeve and above the caster itself without providing any lateral protection for either the caster or the caster sleeve.

The patents or known uses teach and disclose various types of guards and protectors and show various sorts of manufactures as well as methods of their construction, but none of them whether taken single or in combination disclose the specific details of the combination of the invention in such a way and to bear upon the claims of the present invention. Close approach to the present inventive structure was not observed in the above cited references. Accordingly, the patents cited above and their patents of reference should be considered as being of general interest and illustrative of the scope of the available art.

SUMMARY OF THE INVENTION

An object, advantage and feature of the invention is to provide a device that stops or restrains or checks the foot or toe or other portion of the body of a person in proximity to furniture or a bed, from stubbing their toe on the leg, caster, or other support element of the bed and cushions the impact of the person's body and thus eliminates damage or injury. The invention herein is called a "toe Stopper", and it is a device that does not prevent a person from stubbing their toe on the leg or support of a bed or similar article of furniture; but cushions the impact of the person's foot and thus prevents or minimizes damage or injury to the person's foot in such instance.

Another object of the invention is directed further to a device providing for sponge material 10 to cover the caster and leg of the bed leg or support 20 and caster 22 with positive pressure between the bed and the supporting floor 32, thereby preventing even accidental contact between the body parts and the bed support 20, and also the method of construction thereof.

Another object of the invention is to provide a method of making a bed support and caster protector device consisting of the steps of forming a sleeve of generally resilient material having a hollow center and adapted to circumvallate the bed support and the supporting caster thereof and providing a radially disposed cut in at least one radius of the sleeve extending along at least one radius thereof to provide accessing of the formed sleeve onto and around the bed support and caster, by forcing the device open along the radial cut and then allowing the resilience of the device to close around the said support and caster, and also to, in reverse fashion, facilitate its removal therefrom, and providing a longitudinal dimension of the sleeve that is slightly greater in distance than the overall distance between the bed rail, disposed at an upper extremity of the bed support, and the support plane or floor for support of the caster, to effect a slight compression of the sleeve due to its resilient characterization and tending to retain the sleeve in locus between the bed rail and the support plane or floor; and wherein the sleeve has a lower section with a larger diameter at the lower section and has an upper section with a smaller diameter to provide more distribution of the slight compression within the upper section than in the lower section thereof.

These together with other objects and advantages which will become subsequently apparent reside in the details of the process and operation thereof as more fully hereinafter is described and claimed, reference being had to the accompanying drawings forming a part hereof, wherein like numerals refer to like parts throughout.

BRIEF DESCRIPTION OF THE DRAWINGS

FIG. 1, is an isometric view of a bed support and caster protector device and illustrating a typical installation of the system according to a preferred embodiment and best mode of the invention FIG. 2, is a partial cut away view along lines 2—2 of FIG. 1, of the invention as attached to the bed support element.

DESCRIPTION OF THE PREFERRED EMBODIMENT

Referring to the drawings there is shown in the Figures a bed support and caster protector device 10 comprising a resilient collar or sleeve 12, constructed of a cylindrical body of a generally resilient material having a hollow center for attachment to the bed support element 16, and adapted to circumvallate the bed support and the supporting caster 22. A radially disposed cut 26, along at least one radius thereof to provide accessing of the sleeve around the bed support 20, and caster 22, and also to facilitate its removal therefrom.

The sleeve 12, has a longitudinal dimension of the sleeve that is slightly greater in distance than an overall distance between a bed rail 30, disposed at an upper extremity of the bed support 20, and a support plane or floor 32, for support of the caster 22, to effect a slight compression of the sleeve 12, due to its resilient characterization and tending to retain the sleeve 12, in locus between the bed rail 30, and the support plane or floor 32; the sleeve 12, has a lower section 40, with a larger diameter at the lower section 40, and has an upper section 42, with a smaller diameter to provide more distribution of the slight compression within the upper section 42, than in the lower section 40.

The internal diameter of the sleeve opening 13, is uniform from top to bottom as shown by the phantom portion of the view. The material that this is made of is open cell sponge-like resilient material, such as natural rubber, expanded polyurethane, and similar plastics.

Referring to FIG. 2, the invention is shown in partial cross-section as installed, or attached. The upper collar having slightly less pressure exerting force available because of the smaller external diameter of the upper cylindrical section 42, is compressed and deformed as shown at 14. The height of the two parts of the device is chosen to be slightly higher ($\frac{1}{4}$ to $\frac{3}{4}$ of an inch) than the distance between the bottom of the bed rail 30, so that the deformation shown will occur, and as a result keep a positive downward pressure on the lower protective collar 11, keeping it urged against the supporting surface or floor. To avoid having to lift a corner of the bed each time the device 10, is attached (surrounds or circumvallates) the bed support element 16, there is a radial cut 26, thru one side of the device, from top to bottom, or visa versa, radially disposed as shown along line 17, completely thru to the sleeve opening 13. The sleeve 12, is of a sponge material, an elastomeric material, expanded polyurethane material, a foam material, a resinous material or an open cell material removably available to wash and sanitize the device 10, by methods known in the art.

The apparatus of the bed support and caster protector device 10, of the invention may be so constructed and arranged in its component parts that it may be assembled as a kit or in kit form.

The foregoing is considered as illustrative only of the principals of the invention. Further since numerous modifications and changes will readily occur to those skilled in the art, it is not desired to limit the invention to the exact construction and operation shown and described, and accordingly, all suitable modifications and equivalents may be resorted to falling within the scope of the invention.

I claim:

1. Furniture and bed support and caster protector device comprising
    sleeve means constructed of a cylindrical body of generally resilient material having a hollow center and adapted to to circumvallate the support and the supporting caster thereof,
    a radially disposed cut in the sleeve means extending along at least one radius thereof to provide accessing of the sleeve means onto the bed support and caster and its removal thereof, and
    the sleeve means having a longitudinal dimension being slightly greater in distance than the overall distance between a bed rail of the bed support disposed at an upper extremity of the bed support and a support plane or floor for support of the caster to effect a slight compression of the sleeve means due to its resilient characterization and tending to retain the sleeve means in locus between the bed rail and the support plane or floor.

2. The device of claim 1 wherein the sleeve means has an upper and lower section wherein the lower section has a larger outside diameter than the upper section for receiving the caster to provide more distribution of the slight compression within the upper section than the lower section.

3. The device of claim 1 wherein the sleeve means is a sponge material.

4. The device of claim 1 wherein the sleeve means is of an elastomeric material.

5. The device of claim 1 wherein the sleeve means is of an expanded polyeurethane material.

6. The device of claim 1 wherein the sleeve means is of a foam material.

7. The device of claim 1 wherein the sleeve means is of an elastomeric material.

8. The device of claim 1 wherein the sleeve means is of a resinous material.

9. The device of claim 1 wherein the sleeve means is of an open cell material that is removably available for washing and sanitizing the device.

10. The device of claim 1 wherein the sleeve means is of a plastic material.

11. Method of making a furniture or bed support and caster protector device comprising the steps of
   forming a sleeve means of generally resilient material having a hollow center and adapted to circumvallate the bed support and caster,
   radially through cutting the sleeve means lengthwise from end to end to provide accessing of the sleeve means onto the bed support and caster and for its removal thereof, and
   providing a longitudinal dimension of the sleeve means that is slightly greater than the overall distance between a bed rail disposed at an upper extremity of the bed support and a support plane or floor of the support of the caster to effect a slight compression on the sleeve means due to its resilient characterization and tending to retain the sleeve means in locus between the bed rail and the supporting plane of floor.

12. The method of claim 11 wherein said forming step comprises forming the sleeve means with an upper and lower section wherein the lower section has a larger outside diameter than the upper section to provide more distribution of the slight compression within the upper section than in the lower section.

13. The method of claim 11 wherein the sleeve means is a sponge material.

14. The method of claim 11 wherein the sleeve means is of an elastomeric material.

* * * * *